United States Patent Office 3,580,717
Patented May 25, 1971

3,580,717
METHOD OF OBTAINING A SPONGY METAL INGOT IN A SHAFT FURNACE
Mikhail Ivanovich Kononov, Svobodny prospekt 9, korpus 2, kv. 55; Evgeny Anatolievich Krasheninnikov, Ulitsa A. Sviridova 1, kv. 7; Vladimir Fedorovich Knyazev, Nikitinskaya ulitsa 5, kv. 53; Evgeny Nikolaevich Vasiliev, Ulitsa Barklaya 5, korpus 1, kv. 54; Petr Yakovlevich Nasonov, 5 Parkovaya ulitsa 26, kv. 89; and Evgeny Petrovich Timofeev, Golynaovo 18, kv. 89, all of Moscow, U.S.S.R.
Filed Sept. 22, 1967, Ser. No. 669,815
Int. Cl. C21b *13/02;* C22b *5/02*
U.S. Cl. 75—37                                    3 Claims

ABSTRACT OF THE DISCLOSURE

A method of obtaining a spongy metal comprises reducing metal-containing oxides with a solid reducing agent in an externally heated shaft furnace by charging the furnace with separate flows of the metal-containing oxides and a solid reducing agent, the metal-containing oxides and reducing agent flowing coaxially with the reducing agent surrounding the metal-containing oxides. Heating the oxides and reducing agent to result in reduction of the oxides and sintering of the metal thereby produced into a sponge metal ingot. The metal ingot passes from the furnace through an opening in a receiving table while the reducing agent is removed from the table.

---

Figure 1:
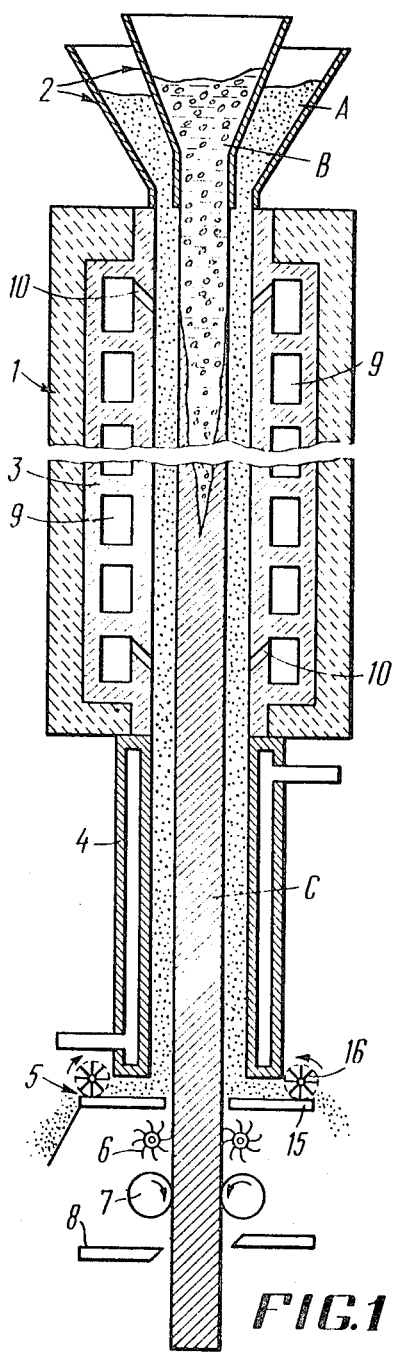
Figure 2:
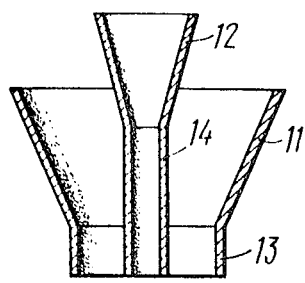

The present invention relates to methods of obtaining a spongy metal, in particular sponge iron.

The spongy metal is employed for the production of a metal powder, and for the manufacture of high-quality steels.

Known in the prior art is a method of obtaining a spongy metal, in particular sponge iron, by reducing metal-containing oxides with a solid reducing agent in an externally heated shaft furnace (see the patent of Germany, No. 490,409, class 18a, group 18/03, filed on Oct. 1, 1926).

The existing method suffers from a number of disadvantages.

The process of manufacturing a spongy metal according to the existing method is rather time-consuming, since the temperature of the reducing process does not exceed 1000° C. At more elevated temperatures, the mixture composed of solid reducing agent and metal-containing oxides begins to soften and sinter, especially when comminuted oxides are used, which brings about a deposit of the charge in the furnace shaft, which interferes with the descent of the charge, thus disturbing the continuity of the manufacturing process. Charging into the shaft furnace of a mixture composed of metal-containing oxides and solid reducing agent is conducive to the contamination of the spongy metal thus obtained with ash and residues of the solid reducing agent. Additional manufacturing operations, such as crushing and magnetic separation, are required in order to free the metal from undesirabls impurities. The ash and residues of the solid reducing agent, however, cannot be completely eliminated from their mixture with the spongy metal, which results in a deterioration of the quality of the spongy metal thus obtained.

It is an object of the present invention to provide a method of manufacturing a spongy metal in which the operations of reducing and sintering of metal oxides take place without their melting in the furnace, where a temperature exceeding 1000° C. is maintained.

Another object of the invention is to provide such a method of manufacturing a spongy metal, which makes unnecessary the operations of crushing and magnetic separation of the spongy metal obtained.

The principal object of the invention is to provide a method of obtaining a spongy metal, preferably sponge iron, by reducing metal-containing oxides by a solid reducing agent in an externally heated shaft furnace and, according to the invention, the metal-containing oxides and the solid reducing agent are moved in separate flows in the furnace shaft in such a manner that the flow of metal-containing oxides is inside the flow of the solid reducing agent.

The method proposed herein is effected in a shaft furnace provided with charging and discharging arrangement's in which, in conformity with the invention, the charging arrangement, positioned in the upper portion of the shaft furnace, has at least two coaxially disposed funnels for feeding metal-containing oxides and solid reducing agent into the furnace, the external funnel being intended for charging the solid reducing agent. A receiving table of the discharging arrangement, disposed in the bottom portion of the shaft furnace, is provided with a central opening for passing the sintered spongy metal, and working members are mounted on the table for discharging, spent solid reducing agent from the receiving table and for allowing the spongy metal and solid reducing agent to be moved in the shaft at a uniform speed.

The details of the present invention will become more fully apparent from a consideration of the following description of exemplary embodiments thereof, to be taken in conjunction with the accompanying drawing, wherein:

FIG. 1 is a longitudinal section through a shaft furnace of the invention with charging and discharging arrangements; and FIGS. 2, 3, 4 and 5 represent various embodiments of the charging arrangements.

The shaft furnace 1, shown in FIG. 1, comprises a charging arrangement 2, a reducing chamber 3, a cooler 4, a discharging arrangement 5, rotary metal brushes 6, reducing rolls 7, and shears 8.

The reducing chamber 3 is encircled by heating channels 9. The upper and bottom portions of the reducing chamber 3 are connected by gas ducts 10 to the heating channels 9.

The charging arrangement 2 (FIG. 1) serves for charging the shaft furnace with separate flows of starting materials and comprises two coaxially arranged funnels 11 and 12 (FIG. 2), provided with branch pipes 13 and 14, respectively, for forming these flows. The external funnel 11 with the branch pipe 13 is intended for charging the solid reducing agent A (FIG. 1), while the internal funnel 12 (FIG. 2) with the branch pipe 14 is intended for charging the metal-containing oxides B (FIG. 1).

The shape of the branch pipes 13 and 14 in cross section (FIG. 2) corresponds to that of the reducing chamber 3, while the dimensions of the cross section of the branch pipe 13 are equal to those of the cross section of the reducing chamber 3 of the shaft furnace 1.

Adjoining the bottom portion of the reducing chamber 3 (FIG. 1) of the shaft furnace 1 is the cooler 4, in which the charge materials are cooled to a temperature of 50 to 100° C.

Mounted under the cooler 4 is a discharging arrangement 5 designed in such a manner as to allow separate discharging of the spent solid reducing agent A and a sintered spongy metal C and the discharging arrangement comprises a receiving table 15 and working members, made as blade drums 16. The receiving table 15 is provided with a central opening for passing an ingot of the sintered spongy metal C. The shape and dimensions of the opening in the table 15 correspond to the shape and dimensions of the cross section of the ingot of the sintered spongy metal C. The blade drums 16 effect the discharge of the residues of the solid reducing agent A and ashes from the receiving table 15 and allow transfer of the spongy metal and solid reducing agent in the furnace shaft at a uniform speed. The speed of discharge is selected in conformity with the reduction of the metal-containing oxides.

A cleaning arrangement in the form of rotary metal brushes 6 is intended for cleaning the surface of the spongy metal of particles of the solid reducing agent adhering thereto and of ashes.

A cogging arrangement, designed as reducing rolls 7, is employed for compacting the ingot of the spongy metal and for supporting the ingot at its exit.

To facilitate the further treatment, the ingot of the spongy metal thus obtained is cut into separate pieces by means of a cutting arrangement constituted as shears 8.

The internal space of the reducing chamber 3 should be flared downwards for ensuring a better descent of the material flows.

The working members of the discharging arrangement 5 may also be made as rotating rolls, conveyer belts, grips, and the like.

The cutting arrangement may be also made as a saw or any other cutting tool.

To increase the production capacity and reduce power consumption, a battery consisting of a plurality of the above-mentioned shaft furnaces may be made, complete with charging and discharging arrangements.

Figure 3:
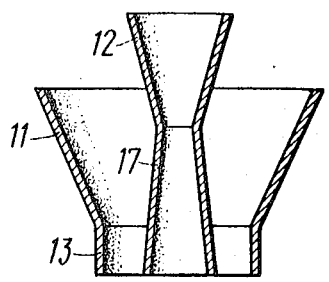

FIG. 3 represents another embodiment of the charging arrangement, where a branch pipe 17 is made with downwardly flaring walls in order to improve the descent of the metal-containing oxides B, especially when they are highly comminuted.

Figure 4:
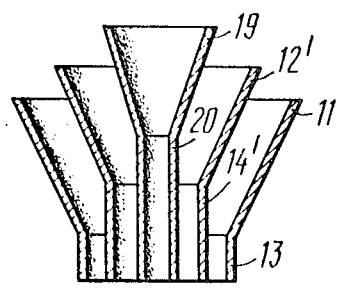
Figure 5:
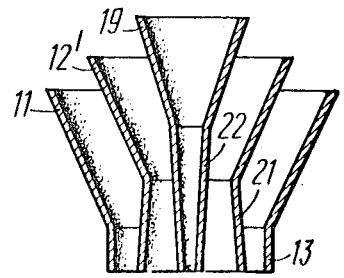

The charging arrangement represented in FIG. 4, is made as three funnels 11, 12', 19, with branch pipes 13, 14', 20 for each funnel. The external funnel 11 with the branch pipe 13 and the internal funnel 19 with the branch pipe 20 are intended for charging the solid reducing agent. Metal-containing oxides are charged into the funnel 12' with the branch pipe 14'. In this case, owing to the presence of the additional funnel 19 with the branch pipe 20 for the solid reducing agent, the spongy metal can be obtained in the form of a pipe or of two ingots of a rectangular cross section.

The walls of the branch pipes 21 and 22 (FIG. 5), intended for the flow of metal-containing oxides, may be made with a small flare downwards for a better descent of the metal-containing oxides.

In the proposed method of obtaining the spongy metal, depending upon the sulfur content in the solid reducing agent, limestone or other sulfur-absorbing reagent can be added thereto with a view of decreasing the sulfur content in the obtained metal.

In order to speed up the reduction process, a solid reducing agent with a low sulfur and ash content, for example, soot, charcoal, petroleum coke, and the like, can be added to the metal-containing oxides in an amount theoretically necessary for effecting the full reduction of the metal oxides.

The shaft furnace operates in the following manner.

When starting the shaft furnace, the central opening in the receiving table 15 of the discharging arrangement 5 (FIG. 1) is closed. The furnace is first charged through the funnel 11 and branch pipe 13 with the solid reducing agent A, thereby filling the working spaces of the funnel 11, branch pipe 13, reducing chamber 3 and cooler 4. Then the reducing chamber 3 is preheated to a temperature exceeding 1100° C., but below the melting points of the metal oxides. Thereafter, the blade drums 16 of the discharging arrangement 5 are actuated, and the metal-containing oxides B are simultaneously charged through the funnel 12 and branch pipe 14. The discharging of the spent solid reducing agent also brings about the motion of the metal-containing oxides. Later the flow of the solid reducing agent A, charged through the external funnel 11 and the flow of metal-containing oxides B, charged through the funnel 13, arrive in the shaft furnace continuously and simultaneously. Said materials, continuously moving downwards in separate flows, begin to be heated throughout. The solid reducing agent is gasified. The metal-containing oxides, arriving in the heated reducing chamber 3 of the shaft furnace 1, are reduced and sintered together, forming an ingot of the sintered metal C.

The presence of the flow of the solid reducing agent near the walls of the reducing chamber 3 prevents the flow of metal-containing oxides from adhering to the walls of the chamber 3 and the formation of crusts or sows is eliminated. As a result, there is ensured a continuous descent of the solid reducing agent and metal-containing oxides at temperatures exceeding 1000° C.

The speed of descent of the ingot of the metal thus obtained depends upon the speed of discharge of the residues of the solid reducing agent and ash.

The proposed method allows the manufacture of high-quality spongy metal. The manufacturing process occurs without the formation of any crust or sows. The proposed method can use finely crushed metal oxides. The reduction process is considerably speeded up by raising the temperature in the shaft furnace above 1000° C. At the same time, the metal-containing oxides cannot be melted, since the temperature maintained in the shaft furnace is below the melting point of the oxides.

Though the present invention is described in connection with preferred embodiments thereof, it is obvious that modifications and variations may be made without departing from the true spirit and scope of the invention, as those skilled in the art will readily understand.

What is claimed is:

1. A method of obtaining a spongy metal in a shaft furnace, comprising separately supplying metal-containing oxides and solid reducing agent in a shaft furnace, confining the flow of metal-containing oxides wholly within the flow of said solid reducing agent in the shaft furnace, conveying the separate flows of metal-containing oxides and reducing agent through an externally heated heating zone, heating the separate flows in said heating zone whereby the oxides are reduced and sintered to form a spongy metal ingot, separating the reducing agent from said metal ingot, and continuously withdrawing said metal ingot from said shaft furnace.

2. A method as claimed in claim 1, wherein said metal-containing oxides and reducing agent travel in coaxial relation through the furnace.

3. A method as claimed in claim 2, wherein the reducing agent is separated from the ingot by passing the ingot through an opening in a receiving table while retaining the reducing agent on said table, and removing the reducing agent from the table.

References Cited

UNITED STATES PATENTS

| | | | |
|---|---|---|---|
| 455,458 | 7/1891 | Eames | 75—41 |
| 815,016 | 3/1906 | Héroult | 266—27X |
| 906,717 | 12/1908 | Johnson | 266—27 |
| 1,065,890 | 6/1913 | Sieurin | 75—37 |
| 1,945,341 | 1/1934 | Brassert | 75—41 |
| 2,201,738 | 5/1940 | Néve | 266—27 |
| 2,747,988 | 5/1956 | Von Haken | 75—33 |

HENRY W. TARRING II, Primary Examiner

U.S. Cl. X.R.

75—33, 89, 90; 266—27, 25